Dec. 8, 1925.  1,564,574
W. P. HUNT
MACHINE FOR LAPPING AND HONING CYLINDERS
Filed July 29, 1924   4 Sheets-Sheet 4
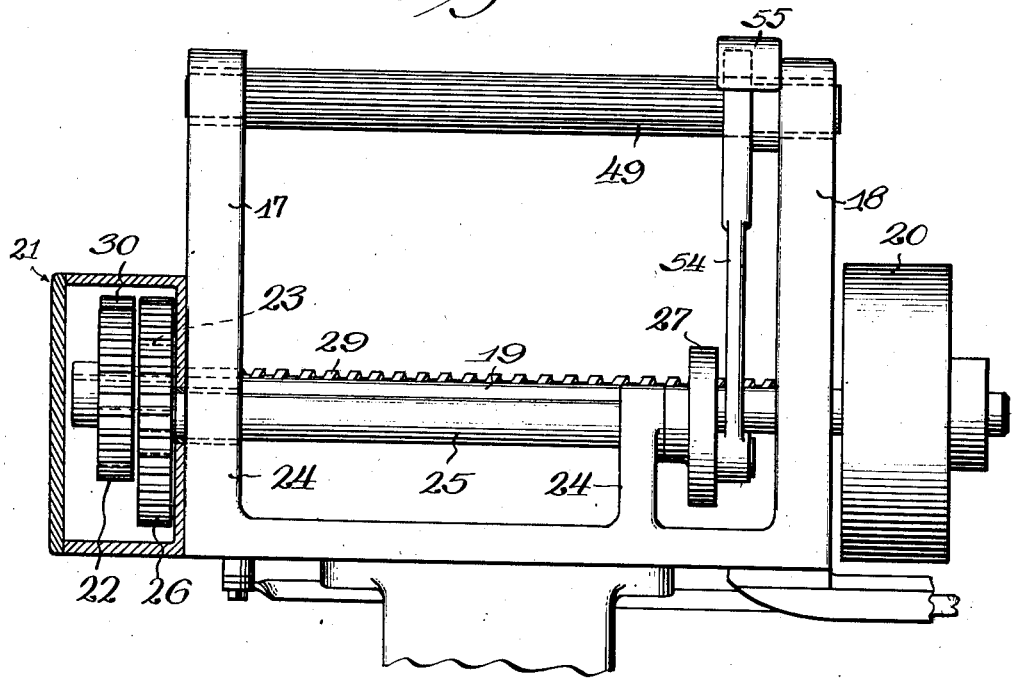
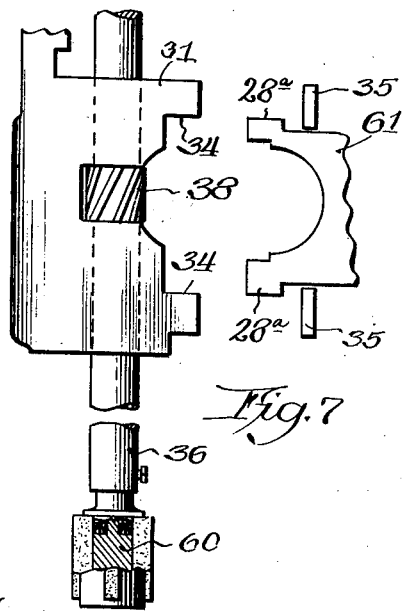
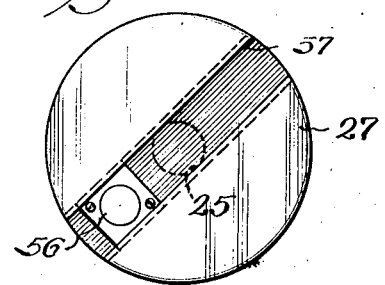

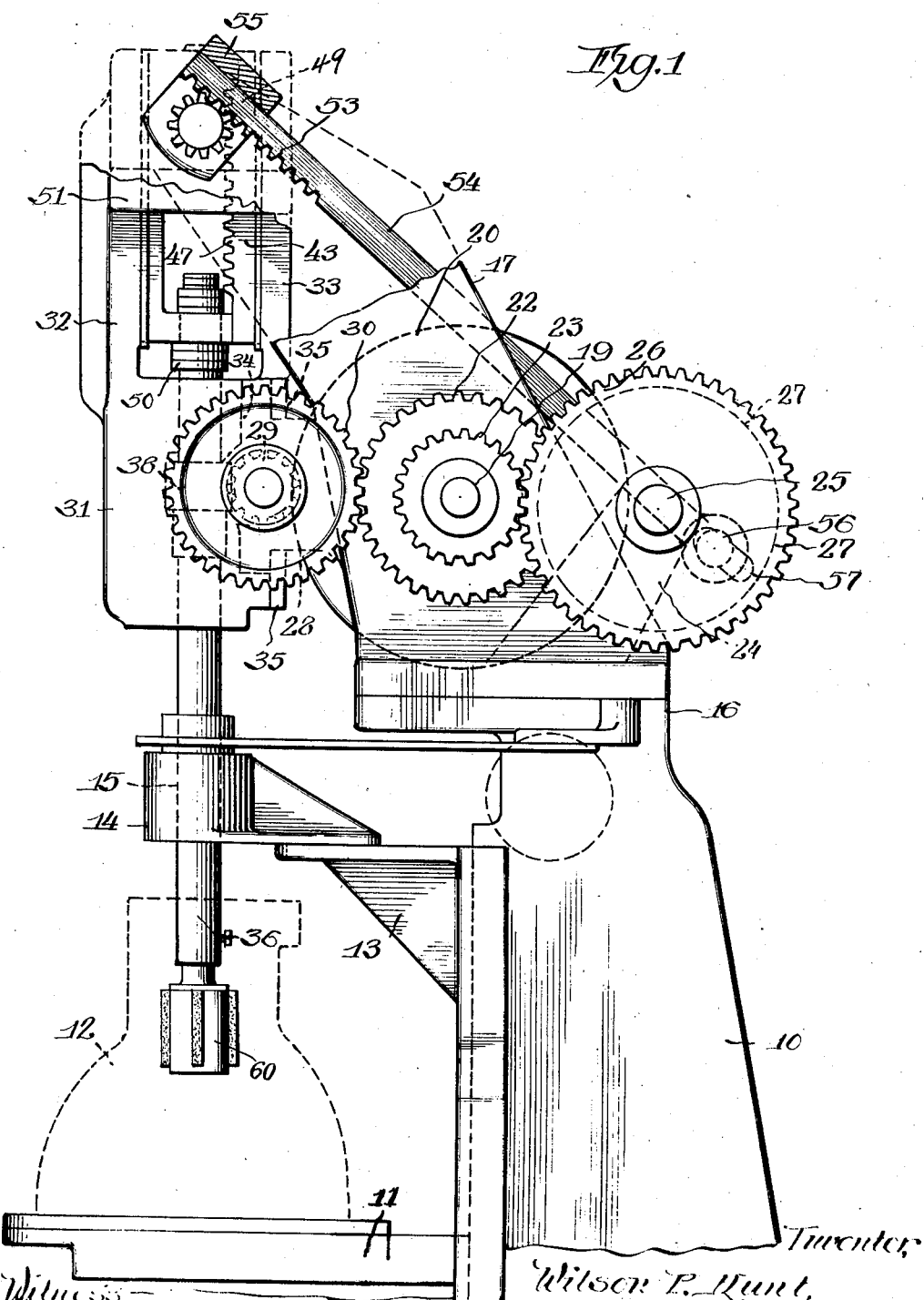

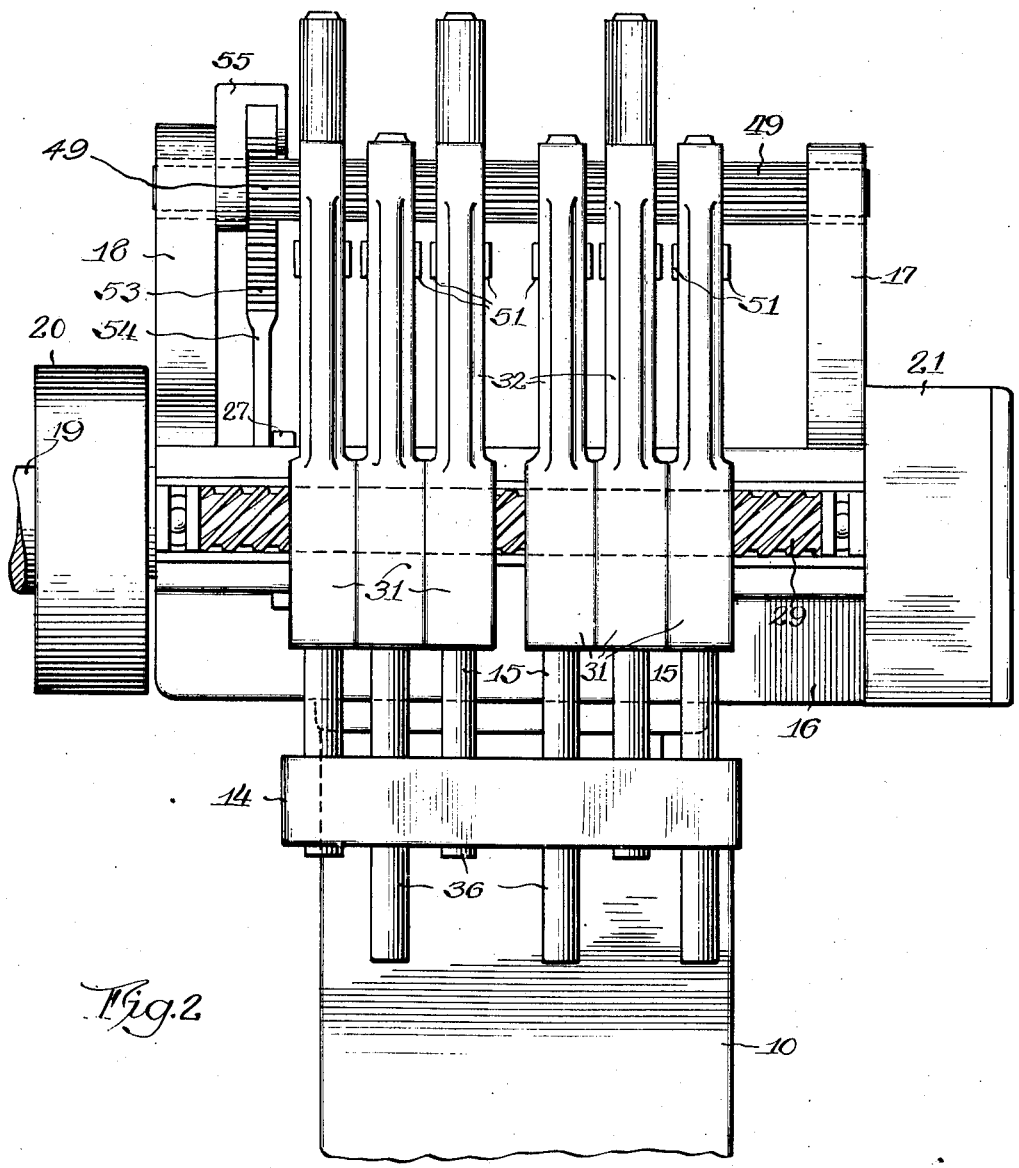

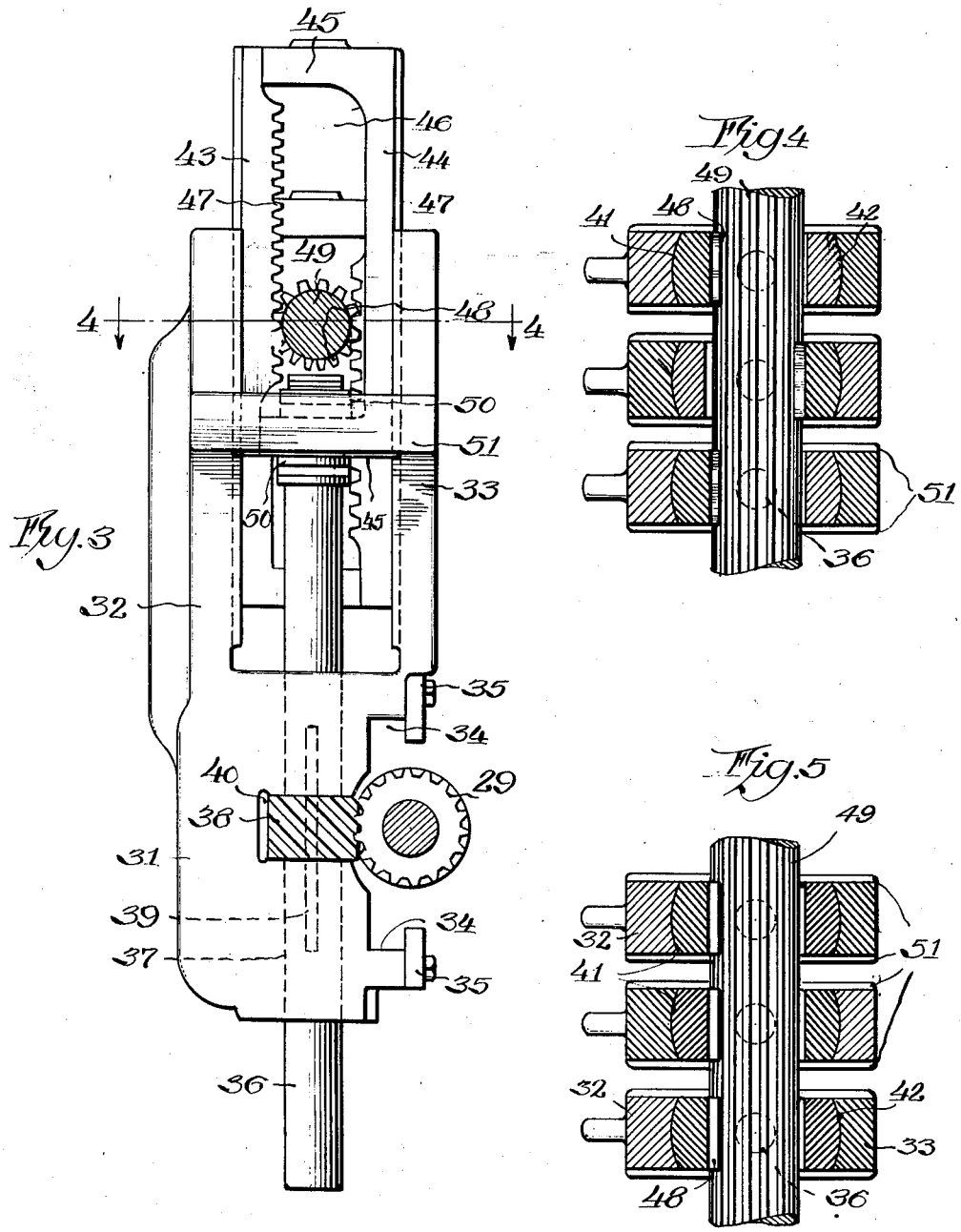

Patented Dec. 8, 1925.

1,564,574

UNITED STATES PATENT OFFICE.

WILSON P. HUNT, OF MOLINE, ILLINOIS, ASSIGNOR TO MOLINE TOOL COMPANY, OF MOLINE, ILLINOIS, A CORPORATION OF ILLINOIS.

MACHINE FOR LAPPING AND HONING CYLINDERS.

Application filed July 29, 1924. Serial No. 728,942.

*To all whom it may concern:*

Be it known that I, WILSON P. HUNT, a citizen of the United States, and a resident of Moline, in the county of Rock Island and State of Illinois, have invented certain new and useful Improvements in a Machine for Lapping and Honing Cylinders, of which the following is a full, clear, and exact description, such as will enable others skilled in the art to make and use the same.

My present invention has more particular reference to an apparatus for lapping the cylinders of internal combustion engines and honing the same, and is specifically directed to the manner of rotating and reciprocating the spindles which carry the laps or hones.

One of the objects of my invention is to provide, in an apparatus of this character, suitable instrumentalities for rotating the spindles that carry the laps or hones and at the same time reciprocate said spindles with respect to the work being operated upon. Another object resides in providing a carrier or slide for reciprocating the spindles that may be withdrawn from its guide and reversed so that the direction of travel of certain spindles will be opposed to the direction of travel of the other spindles. The purpose of making this reversal provision is that it is sometimes desirable to so reciprocate the spindles that one group is traveling up while the other group is traveling down, and in other instances it is desirable that all of the spindles shall be reciprocated simultaneously in the same direction.

In connection with the spindle carrying devices, I have provided an arrangement for guiding the carrier or slide so that it is unnecessary to form a special gib or gib-way, but the same may be bored while the guide bearing for the spindle is being formed. I have also provided novel means for adjusting the length of movement of the spindles so that any desired length of lap may be obtained within certain prescribed limits.

Other objects reside in the provision of a lapping structure that is compact in form; which is fabricated from a minimum of parts, and therefore is economical to manufacture; and which is novel in construction, dependable and efficient in its operation. All of the foregoing objects I attain by means of the structure hereinafter fully described and which is more particularly pointed out in the appended claims, reference being had to the accompanying drawings that form a portion of this specification, in which:—

Figure 1 is a vertical end elevation of the lapping mechanism showing its relation to the work, the lower portion of the standard being omitted.

Fig. 2 is a vertical front elevation of the structure illustrated in Fig. 1, the tools and the work being omitted for clearness.

Fig. 3 is a vertical side elevation of one of the spindle units, including the actuating worm, detached from the machine in order to show its specific construction.

Fig. 4 is a horizontal transverse section on line 4—4 of Fig. 3 showing the relative position of the parts of a group of spindle carriers and their actuating mechanisms wherein the spindle carriers or slides are capable of reciprocation in an alternate manner.

Fig. 5 is a view similar to Fig. 4 but illustrating the arrangement of the parts for simultaneously operating all of the spindles in the same direction.

Fig. 6 is a rear view of the upper portion of the machine.

Fig. 7 is a detail of several of the parts about to be assembled.

Fig. 8 is a face view of the disk for actuating the reciprocating rack that raises and lowers the guides.

In the drawings, I have designated similar parts by the same reference characters wherever the same occur in the several views, and by referring to Figs. 1 and 2 of the drawings it will be seen the structure preferably comprises an upright standard 10 having a laterally disposed table 11 upon which the work is mounted, and in the present instance an engine block 12 has been illustrated by the dotted lines. Projecting laterally from the standard above the table 11 and the work, is a shelf or bracket 13 to the outer portion of which is secured an elongated casting 14 that is transversely bored to provide a plurality of apertures 15 in which the laps withdraw from the work. A platform 16 is secured to the upper end of the standard 10 from the opposite ends of which arise suitable irregularly shaped brackets 17 and 18, and journaled in these brackets is a main drive shaft 19, one extended end of which has a drive pulley 20 secured to it which derives its motion from any suitable source of power. Secured to the opposite end of this main shaft 19 and enclosed within the protective housing 21 is a large gear 22 beside which is secured a pinion 23. Oblique brackets 24 are secured to the platform 16 adjacent the irregular brackets 17 and 18 and which, at their outer ends, are provided with bearings for a horizontally disposed transmission or idle shaft 25. This shaft carries upon one of its ends a gear 26 that meshes with and is driven by the pinion 23, and upon its opposite end is provided with a rotatable disk 27, the purpose of which will hereinafter more fully appear.

Projecting from brackets 17 and 18 is a rail 61 in the form of a lateral extension of T-shaped cross section the length of the frame and arranged with the stem of the T horizontal, and which is provided with bearings for a screw or worm 29 that extends from side to side of the apparatus, as seen in Figure 2 of the drawings. The screw or worm has a reduced portion at one end that extends through the adjacent bracket 28 and has mounted thereon a gear in mesh with the gear 22 upon the main drive shaft through which the worm is actuated continuously in one direction of rotation.

Mounted upon the T-shaped bracket 28 are the supports for the spindles, and as these supports may be of any desired number, corresponding to the number of cylinders to be lapped, the description of a single support will suffice. The structure illustrated in Figure 3 of the drawings is a detached unit and includes the spindle, the worm, and the reciprocating mechanism. The support preferably comprises an elongated casting or body 31 having upright parallel arms or extensions 32 and 33 extending above the same, and the rear edge of the casting or body is cut out in the manner shown in Fig. 3 and shaped to provide right angular recesses or shoulders 34 above and below the worm 29. These shoulders or recesses 34 are adapted to fit the lateral arms 28ª of the T-shaped bracket 28, and after the support has been mounted in position, plates 35 are secured to the rear vertical faces of the body or casting 31 and positioned against the rear faces of the lateral arms so as to secure the structure in position. This permits the body or casting 31 to be slid longitudinally upon the bracket 28 so as to center its lapping spindle axially with respect to the cylinder to be operated upon. The lapping spindle 36 is preferably an elongated round bar having its upper end rotatably mounted in a suitable guide, to be hereinafter described, and its intermediate portion is positioned in a vertical bore 37 made in the body of the holder or support so that the spindle may be reciprocated and rotated as desired and the bore 37 acts as a guide during such movements. Positioned intermediate the top and bottom of the body 31 of the support the spindle has a worm gear 38 splined upon it which is in mesh with the worm 29 so that when the latter is rotated the worm gear will revolve the spindle 36 by means of its spline 39 but permit the spindle to be reciprocated vertically through the worm gear. A recessed bearing 40 is formed in the body 31 of the support and is of a width approximately the thickness of the worm gear 38 so that the same will be afforded suitable bearings when the structure is assembled. The lapping device may be of any of the well-known or desirable types, one of which is schematically shown at 60 in Fig. 7.

The facing surfaces of the parallel extensions 32 and 33 heretofore mentioned are formed concave, as indicated at 41 and 42 in Figs. 4 and 5 of the drawings to provide a gib or guide-way in each face for the slide structure which carries the spindle 36. The curvature of these guides 41 and 42 is concentric with the axis of the spindle 36 and the bore 37 heretofore mentioned. The purpose of making the guides in this manner is that they may be readily bored in the same manner as the bore 37 while these parts of the machine are being fabricated, and this also permits the slides being taken out and turned half way around for the purpose of changing the reciprocation of certain spindles with respect to the remaining spindles. The slide to which mention has heretofore been made, comprises parallel members 43 and 44, the exterior surfaces of which are formed convex and of the same curvature as the concave guides 41 and 42 of the parallel extensions with which they interfit. The member 44 has lateral arms 45 at each end that project horizontally toward and are secured to the respective ends of the member 43 so that when assembled the slide is of substantially rectangular shape and has a central open portion 46. The rear or inner face of the member 43 is provided with a rack 47 that is in mesh with teeth 48 upon a rotary reciprocable shaft 49 that extends transversely through the openings 46 of the slides and has its ends journaled in bearings in the upper ends of the irregular shaped brackets 17 and 18, so that when said shaft 49 is rotated first in one direction and then reversed, the teeth 48 engaging with the rack 47 will raise and lower the slide the desired distance to permit the spindle 36 and the laps or hones 60 carried on the lower end thereof to travel the length of the cylinder it is lapping.

The upper end of the spindle 36 is mounted in the lower lateral arm 45 of the guide member 44 and is supported in anti-friction bearings 50 that are removably secured to the upper and lower faces of the lower arm 45. When the structure is in operation it is customary to alternate the reciprocation of the spindles 36, and to do this I have mounted the racks 47 in an alternate manner;—that is, the first, third and fifth racks are disposed toward the forward or front of the machine while the second, fourth and sixth racks are positioned towards the rear. This may be readily accomplished by detaching the spindles and withdrawing the slides upwardly from their guides and then giving the slides a half-turn and then replacing them in their respective guides after which they may be reassembled with their spindles. In making this change the anti-friction bearings 50 are removed so as to release the spindles 36 from the slides and the pinion shaft 49 is removed longitudinally from its bearings in the bracket arms 17 and 18, thereby releasing the slides so that they may be reversed. In order to maintain the slides against accidental rotation in the guides I place transverse plates 51 upon opposite faces of the vertically extending guide members 32 and 33 which plates act as extra guides for said members and maintain them in proper position.

The means for actuating the pinion shaft 49 comprises a rack or teeth 53 upon the adjacent end of an elongated pitman 54 which rack engages the teeth of the pinion shaft and said rack and pinion are maintained in position upon said pinion shaft by a pivoted yoke 55 in which the rack and pitman may reciprocate. The opposite end of the pitman is adjustably secured to the disk 27 by means of a lateral pin 56 that projects from this end of the pitman and may be secured in divers positions in a radially elongated slot 57 in disk 27. It, of course, will be obvious that the farther the pin 56 is from the axis of the disk 27 the longer will be the distance traversed by the pitman and consequently a greater amount of rotation will be imparted to the shaft 49.

From the foregoing it will be seen that the positions of the racks 47 with respect to the gears or teeth 48 may be adjusted so that alternate spindles will be moved upwardly while others are moved downwardly. It will also be seen that while the carrier is moving downwardly or upwardly with its respective spindle the latter is rotated by means of the worm 29 and the worm gear 38 which is splined on the spindle. By adjusting the length of movement of the pitman 54 the length of travel of the spindle may be correspondingly adjusted.

It is obvious from the foregoing, however, that although the structure has been specifically described in connection with a lapping machine it may be also used in connection with a boring, grinding, or drilling apparatus with but slight changes for adapting it to the desired service.

What I claim is:—

1. A machine of the kind described comprising a support, a slide movable longitudinally thereon, a spindle rotatably carried by said slide and movable therewith, a rack mounted on said slide, a rotary reciprocable shaft, pinion teeth thereon in mesh with said rack, a pitman having rack teeth engaged with said pinion teeth, a rotatable crank-device having rotation with said pitman whereby the latter is reciprocated, said crank device being adjustable whereby the reciprocation of the pitman and movement of the slide are predetermined and may be controlled, a worm-gear splined on said spindle to permit the longitudinal movement of said spindle during its reciprocation with said slide, and a worm element meshed with said worm-gear for rotating the latter said spindle.

2. A machine of the kind described comprising a standard, a plurality of supports mounted thereon, slides reciprocable in said supports, racks mounted on said slides, a rotary reciprocable shaft, teeth thereon in mesh with said racks, a pitman having rack teeth engaged with said toothed shaft, a rotatable crank device having connection with said pitman whereby the latter is reciprocated, spindles rotatably carried by said slides and movable therewith, worm-gears splined on said spindles, and an elongated worm meshing with said worm-gears whereby said spindles are rotated during their reciprocation with their respective slides.

3. In a lapping machine a support, longitudinal parallel extensions projecting upwardly therefrom the facing surfaces of which are formed with correspondingly shaped guides, a rectangular shaped slide having a central open portion the longitudinal exterior edges of said slide being shaped to fit said guides, a spindle having its upper end rotatably journaled in the lower portion of said slide and movable therewith, a rack extending longitudinally of the open portion of the slide, a rotary reciprocable shaft extending through said open portion, a pinion on said shaft in mesh with said rack teeth, and means for actuating said shaft, said slide being capable of reversal whereby to change the direction of reciprocation of said spindle.

4. In a lapping machine a support, longitudinal parallel extensions projecting upwardly therefrom the facing surfaces of which are formed with correspondingly shaped guides, a rectangular shaped slide having a central open portion, the longitudinal exterior edges of said slide being shaped to fit said guides, a spindle having its upper end rotatably journaled in the lower portion of said slide and movable therewith, a rack extending longitudinally of the open portion of the slide, a rotary reciprocable shaft extending through said open portion, a pinion on said shaft in mesh with said rack teeth, a pitman, a rack and pinion connection between said pitman and shaft, and an eccentric device for actuating said pitman, whereby said spindle is reciprocated longitudinally independently of its rotary movement.

5. In a lapping machine, a plurality of rotatable spindles, reciprocable slides upon which said spindles are rotatably mounted, the central portions of said slide being open, racks upon a longitudinal edge of each opening, a rotary reciprocable shaft extending through the openings in said slides, a long pinion on said shaft in mesh with said racks, and means for actuating said shaft, said slides being capable of being reversed with respect to the long pinion whereby certain slides may be reciprocated in a reverse direction, with respect to the other slides.

Signed at Moline, county of Rock Island and State of Illinois, this 22nd day of July 1924.

WILSON P. HUNT.